United States Patent

Yamaya et al.

[11] Patent Number: 5,959,205
[45] Date of Patent: Sep. 28, 1999

[54] WEIGHT TAPE FOR MODIFYING UNBALANCE OF A TIRE WHEEL

[75] Inventors: Kenjirou Yamaya, Kodaira; Yutaka Naruse, Hoya, both of Japan

[73] Assignee: Bridgestone Corporation, Tokyo, Japan

[21] Appl. No.: 08/739,356

[22] Filed: Oct. 30, 1996

[30] Foreign Application Priority Data

Nov. 1, 1995 [JP] Japan ................................. 7-285315

[51] Int. Cl.$^6$ ............................. F16F 15/32; G01M 1/32
[52] U.S. Cl. ............................................. 73/468; 301/5.21
[58] Field of Search ............................. 73/468, 469, 470, 73/462; 301/5.21; 74/573 R; 152/154.1; 156/75

[56] References Cited

U.S. PATENT DOCUMENTS

| | | | |
|---|---|---|---|
| 2,029,132 | 1/1936 | Skelton | 301/5.21 |
| 2,640,727 | 6/1953 | Kennedy | 301/5.21 |
| 3,177,039 | 4/1965 | Skidmore | 301/5.21 |
| 3,960,409 | 6/1976 | Songer | 301/5.21 |
| 4,170,896 | 10/1979 | Korkosz | 73/462 |

FOREIGN PATENT DOCUMENTS

| | | |
|---|---|---|
| 1586130 | 2/1970 | France . |
| 2522149 | 11/1976 | Germany . |
| 9013697 | 10/1991 | Germany . |
| 4431878 | 3/1996 | Germany . |
| 7-19650 | 4/1995 | Japan . |

*Primary Examiner*—John E. Chapman
*Attorney, Agent, or Firm*—Sughrue, Mion, Zinn, Macpeak & Seas, PLLC

[57] ABSTRACT

A weight tape for modifying unbalance of a tire wheel, which is used by cutting precisely into a length having desired weight. The weight tape comprises a tape-like base portion having a relatively thin thickness and a constant width and suitably made of a high specific gravity material such as lead, and a heat resistant adhesive portion on the rear surface of the base portion, wherein a basic scale and a subsidiary scale indicating a certain weight are marked on the base portion. The tape may be provided in a shape of an oblong object, or a wound object wherein a separable material is attached on the adhesive portion. The weight tape is used in a shape of a weight piece which is cut from the weight tape to have a desired weight by using the basic scale and the subsidiary scale.

14 Claims, 3 Drawing Sheets

PRIOR ART

WEIGHT TAPE FOR MODIFYING UNBALANCE OF A TIRE WHEEL

BACKGROUND OF THE INVENTION

1. Field of the Invention

This invention relates to a weight tape for modifying an unbalance of a tire wheel, and in particular for modifying an unbalance of the weight of a tire wheel which is a combination of a wheel and a tire.

2. Description of the Prior Art

Conventionally, there are provided weights for modifying an unbalance of a tire wheel, which comprise a plurality of weight pieces each having a certain amount of weight and substantially separated from each other on a separable sheet.

However, the unbalance of weight of the tire wheel to be modified is often inconsistent with the weight of the weight piece. Therefore, in fact, it is often necessary to modify the unbalance without using this basic weight as it is. In this case, since the weight piece is cut by eye measurement to have the necessary weight, the weight of the cut weight piece tends to be inexact and some unbalance still remains, and consequently the efficiency of the modification to the tire wheel to balance it is low.

In addition, the conventional weight piece for modification is made to have a shape, under a prerequisite that the weight piece having a weight close to the weight needed to modify the unbalance is selected for use and then the weight is adhered so that the weight of the weight piece is narrowly concentrated to the location on the wheel required to modify the unbalance.

FIG. 7 of the accompanying drawings shows an example of a conventional weight piece 20 which is thick at a center portion and has an adhesive portion 22 adhered on an inner surface of a rim of a wheel. This shape is used for a weight having a relatively large weight and fits the shape of the inner surface of the rim so that the weight is concentrates to the location to be modified. FIG. 8 of the drawings shows another example of a conventional weight piece 20 having an elliptical shape which also has an adhesive portion 22 and is attached on the inner surface of the rim. FIG. 9 shows another example of a conventional weight piece 20 comprising a cylindrical shape portion and a clip 24, which is attached by driving the clip between a flange portion of the rim and the tire.

In these cases wherein the concentrated modification is achieved, a slight vibration similar to a vibration caused by remaining unbalance occurs during actual driving and comfort and stability of driving are degraded.

It is possible to adopt a system utilizing many kinds of weight pieces having different basic weights, wherein a weight piece having a smaller basic weight, which is less than required when one basic weight is used, is selected and both weight pieces are adhered. However, since demanding high-speed driving performance for vehicles is increasingly required and there is a need to remove vibration during high-speed driving, and precise modification within a weight difference of one gram or less is required. As a result, in this system, small weight pieces having a weight of one gram or less have to be used. In this case, it is difficult to prevent dust from adhering to the adhesive portion of the weight pieces and it is also difficult to handle them and maintain their shape. Further, tight adhesion to the wheel is disturbed and there is a possibility of removal during driving and of thus generating wheel vibration.

Furthermore, since tire wheels are often required to be fashionable such as the preference for aluminium wheels, it is increasingly required that the weight for modification is adhered to the radially inner surface of a rim (which is called "inner surface of a rim" hereinafter) at an axially inside portion of the wheel on viewing from a vehicle on which the tire wheel is mounted in order not to expose the weight piece. The rim is composed of a multiple curved surface and a disc portion of the wheel also has many kinds of concave and convex portions, and therefore a weight piece having conventional size and shape often cannot be adhered to the point which should be modified. In this case, the weight piece has to be adhered at a position nearest the exact position which should be modified not to protrude out of the wheel, and consequently the effect of modification of unbalance is decreased by this difference of position.

For the purpose that a weight piece having a certain weight is adhered so that the weight of the weight piece exactly concentrates at the location to be modified, it is possible to make its thickness larger than its length. However, the weight piece becomes lump-like and causes problems such as contacting braking apparatus. Further, in the case of this thick weight piece, it is difficult to cut other than along a cutting line which is provided for the purpose of easy cutting and formed during the producing process of the weight piece, and the cutting causes distortion of the weight piece which prevents it from secure adhesion, resulting in dropping or scattering during driving or generating of vibration.

An object of this invention is to overcome the above mentioned problem, that is to provide a weight tape for modifying unbalance which can modify unbalance within a small weight difference of one gram or less and contribute to eliminating vibration precisely during high speed driving.

SUMMARY OF THE INVENTION

The present invention provides a weight tape for modifying unbalance of a tire wheel, comprising a tape-like base portion which has substantially uniform thickness and constant width, wherein a basic scale indicating a basic weight is drawn or otherwise marked on the base portion.

It is preferable that one or more numerals which indicate a basic weight can accompany the basic scale, and further one or more letters such as g or gr which indicate a unit of weight can accompany the numeral(s). Furthermore, a subsidiary scale can be drawn in a space between the basic scales so as to equally divide the scales.

According to this invention, the weight material is formed into tape-like shape, and the weight tape can be cut into a desired length by using the scale or the subsidiary scale which is drawn on the weight tape. The thickness of the base portion is preferably in the range from 0.3 mm to 1.0 mm, more preferably from 0.5 mm to 1.0 mm. Since the tape is made relatively thin, it can be cut into weight pieces easily and exactly by simple cutting tools such as scissors. Further, even if there is only a small space between the wheel and brake apparatus, the adhered weight piece does not contact the brake apparatus. If the thickness of the base portion is more than 1.0 mm, it is difficult to adhere the weight piece precisely along a curved surface, and therefore there is a possibility of separation. The width of the tape is preferably in a range from 10 mm to 40 mm for handling, more preferably from 14 mm to 25 mm. When the minimum weight of one scale or subscale is set to be 1 gram or less, it is possible to modify any unbalance with high accuracy.

It has been found by the inventors that any unbalance is effectively modified by adhering a weight tape to extend in a circumferential direction of the wheel, and this invention provides a relatively thin weight tape, which is intended to be used by cutting into a length having a desired weight. Therefore, the adhered weight effectively modifies the weight unbalance.

Since the weight tape can be easily cut into a desired length, it is possible to modify unbalance of a tire wheel having a disc with complicated shape such as a spoke-type disc such that the weight tape is first cut temporarily into a length longer than a length having desired weight, and then the cut weight tape is further cut partially in compliance with the shape of the wheel.

The base portion is suitably made of a high specific gravity material such as lead, iron and rubber or plastic mixed with steel powder. Further a direction of adhesion is preferably indicated on the base portion, so that an operator is instructed to adhere the cut weight tape (which is called the "weight piece" hereinafter) in the circumferential direction resulting in effective elimination of the unbalance.

It is preferable that the weight tape further comprises a heat resistant adhesive portion with separable material. This adhesive portion allows the weight tape to be conveniently attached to the wheel. Further the weight tape is preferably provided in the shape of an oblong object having a certain length or in the shape of a wound object to have a certain diameter with a separable sheet between each winding of adhesive portion. The weight tape of oblong shape having a certain length with an adhesive portion and separable sheet can enhance its handling property and modification efficiency such as cutting. On the other hand, the weight tape of wound shape, which is used by rewinding, also enhances working efficiency because it is compact and handy to carry and use.

DESCRIPTION OF THE PREFERRED EMBODIMENTS

Embodiments of the weight tape for modifying unbalance of a tire wheel according to this invention will be explained with reference to FIGS. 1 to 3.

Figure 1:
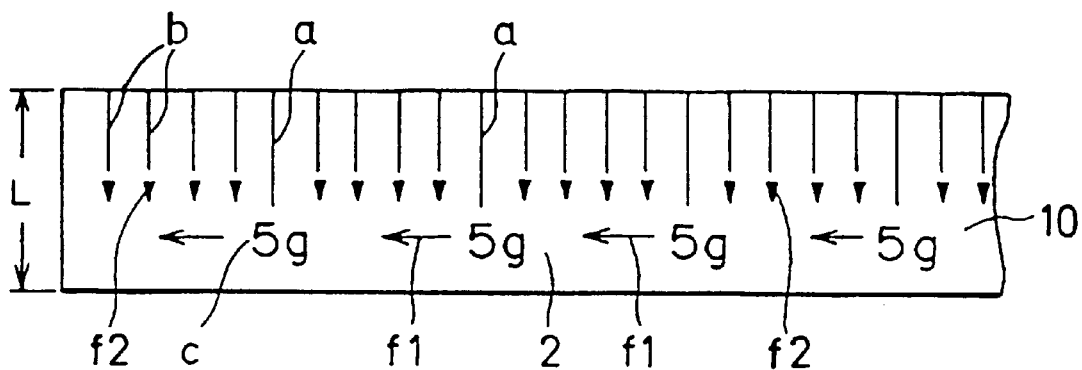
FIG. 1 is a plan view showing an embodiment of a weight tape for modifying unbalance of a tire wheel according to this invention.
Figure 2:
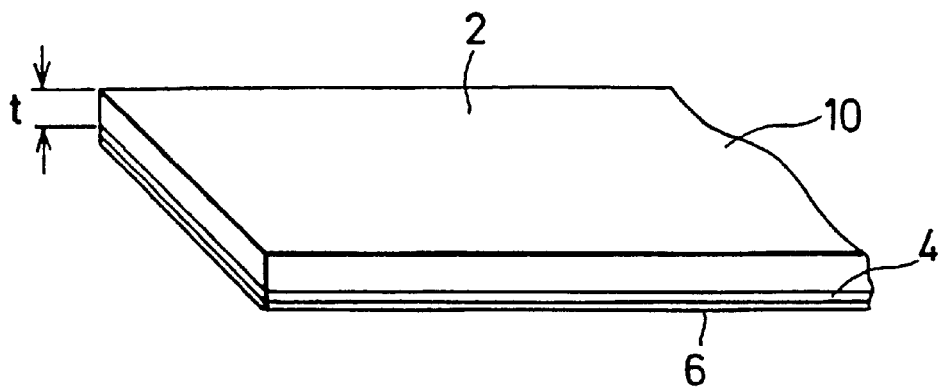
FIG. 2 is a perspective view of the weight tape for modifying unbalance of a tire wheel according to this invention.

An embodiment of a weight tape 10 for modifying an unbalance of a tire wheel, as shown in FIG. 1 and FIG. 2, comprises a tape-like base portion 2 made of lead having a width L of 16.0 mm and a thickness t of 1.0 mm, and a heat resistant adhesive portion 4 made for example of an acrylic type adhesive and provided on one side of the base portion 2, wherein base scales a are drawn to mean every five grams as a basic weight on the base portion at the side thereof opposite from that side on which the adhesive portion 4 is provided.

An indication such as arrow f1 indicating a direction of adhesion is drawn near the scale a, whereby, when the weight tape is cut into a weight piece length longer than the length of the basic weight, it is possible to indicate that the weight piece should be adhered such that the direction of the indication f1 corresponds to a circumferential direction of the tire wheel. It is preferable to indicate, on the weight tape or a separate explanation, to adhere the weight tape in above mentioned manner.

Four subsidiary scales b are drawn between basic scales, which are useful for cutting in an order of one gram. In this embodiment, minimum weight is one gram; however, it is possible to make the minimum weight less than one gram.

Further by drawing another indication such as arrow f2 indicating the direction of adhesion near the subsidiary scale, when the weight tape is cut into a small piece, for example a piece having the minimum weight, it is possible to instruct that the weight piece should be adhered such that the direction of the indication f2 corresponds to the circumferential direction of the tire wheel.

A numeral c indicates the basic weight. In FIG. 1, the numeral 5 which means 5 grams is drawn with the scale a. A letter g which means grams, a unit of weight, accompanies the numeral 5. In FIG. 2, any drawing such as scales on the base portion 2 is omitted.

Figure 3:
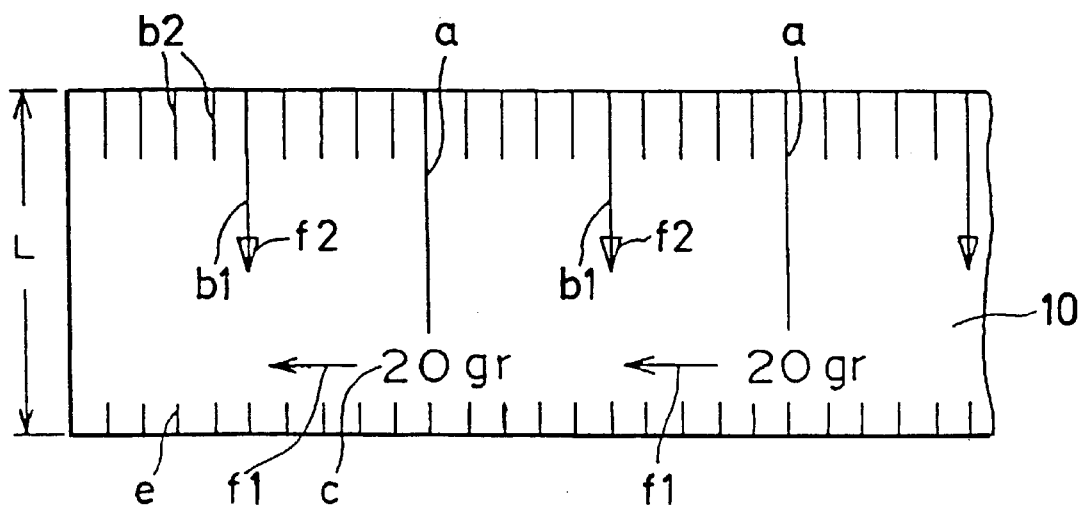
FIG. 3 is a plan view showing another embodiment of a weight tape for modifying unbalance of a tire wheel according to this invention.

FIG. 3 shows another embodiment of the invention in which the weight tape 10 made of lead has a basic weight of 20 grams and is provided with the subsidiary scales indicating 10 grams and 2 grams.

That is, the basic scales a are drawn every 20 grams, the subsidiary scale b1 is drawn at the center between the basic scales a, a and the subsidiary scales b2 are drawn to equally divide the space between the basic scale a and subsidiary scale b1 into five spaces. Therefore, the space between adjacent scales b2, b2 means a weight of 2 grams, the space between adjacent scales a, b1 means a weight of 10 grams and the space between adjacent scales a, a means a weight of 20 grams. Here, a letter gr shown in FIG. 3 also means the weight unit of grams.

At the opposite edge of the subsidiary scales b2, there are also provided subsidiary scales e, which are convenient for cutting when the tape has a wide width. In this case, the spaces between basic or subsidiary scales are determined by the thickness t and width L of the weight tape. That is, a desired weight tape for modifying an unbalance of tire wheel can be made by selecting the material, thickness t and width L.

An indication such as arrow f2 showing the direction of adhesion is drawn near the scale b, whereby, when the weight tape is cut into a small piece using the subsidiary scale b or nearby, it is possible to indicate that the weight piece should be adhered such that the direction of the indication f2 corresponds to a circumferential direction of the tire wheel. Further, an indication showing adhesion direction such as arrow f1 is also drawn near the basic scale a in the same manner as in FIG. 1.

In this case, it is of course intended that the cut weight piece is adhered in a manner so that the direction of a long edge of the weight piece corresponds to the circumferential direction of the wheel. It is possible to instruct, on the weight tape or a separate explanation, to adhere the cut weight piece in the above mentioned manner.

The weight tapes 10 for modifying unbalance of a tire wheel described with reference to FIGS. 1 to 3 are provided in the shape of an oblong object having a certain length or in the shape of a wound object, wherein separable material 6 such as a separable sheet is attached on the heat resistant adhesive portion 4 (see FIG. 2). In each case, the tape is cut together with the separable material 6 to be of desired length by a cutting tool such as scissors and the separable material is removed from the adhesive portion 4 just before the tape is adhered to the wheel. Thus it possible to prevent foreign substances such as dust from adhering to the adhesive portion 4 and to make working of modification efficient.

Figure 4:
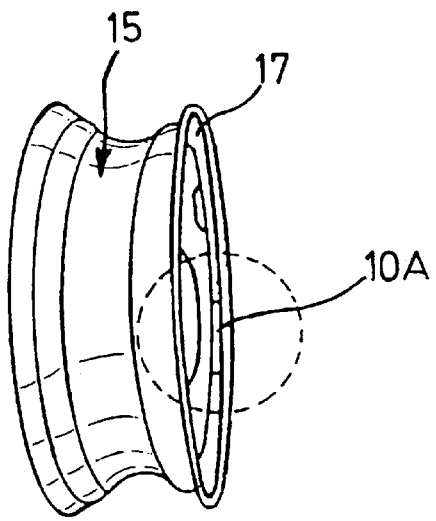
FIG. 4 is a perspective view showing an embodiment wherein a weight piece is adhered at an outer side of a wheel.
Figure 5:
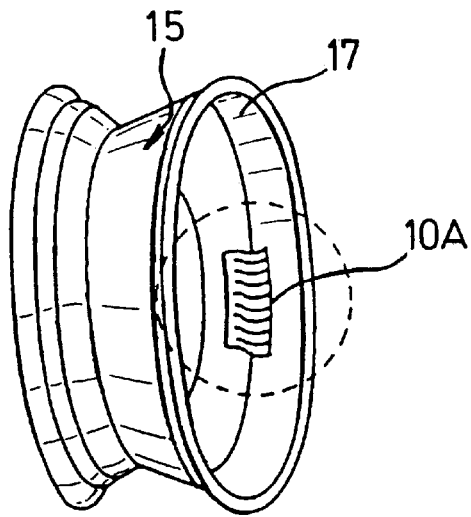
FIG. 5 is a perspective view showing another embodiment wherein a weight piece is adhered at an inner side of a wheel.
Figure 6:
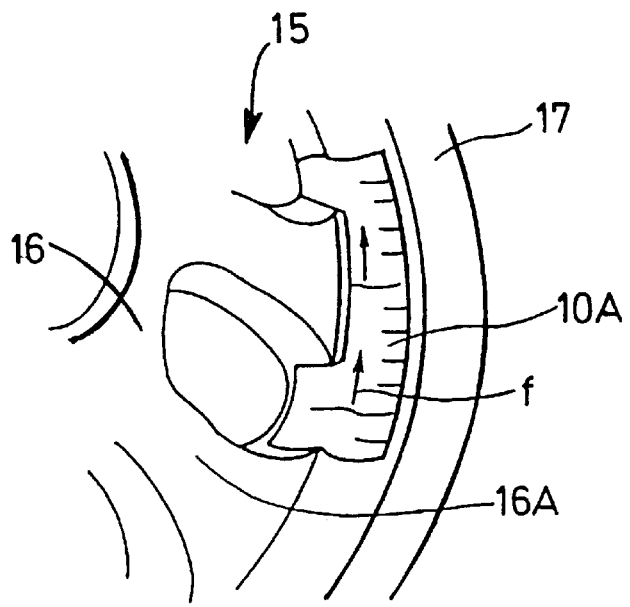
FIG. 6 is an enlarged perspective view showing another embodiment wherein a weight piece is adhered at a spoke portion of a wheel.
Figure 7:
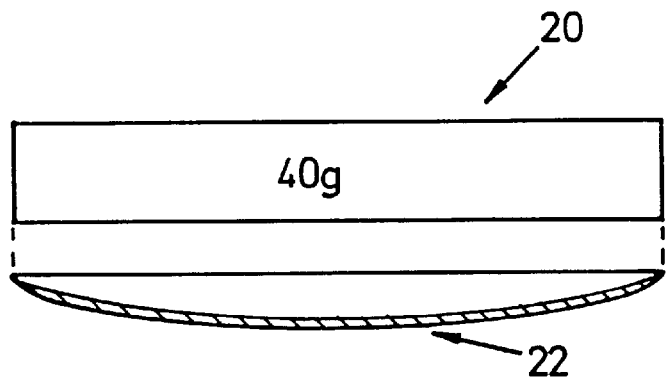
FIG. 7 is a plan view and a sectional view showing a conventional weight piece.
Figure 8A:
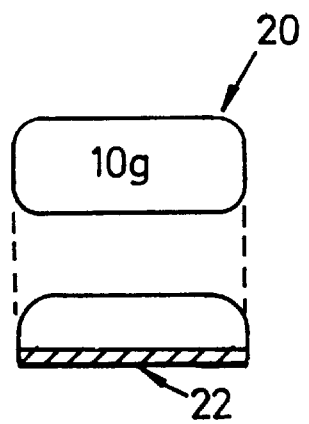
FIGS. 8(a) and 8(b) are each a plan view and a sectional view showing other conventional weight pieces.
Figure 8B:
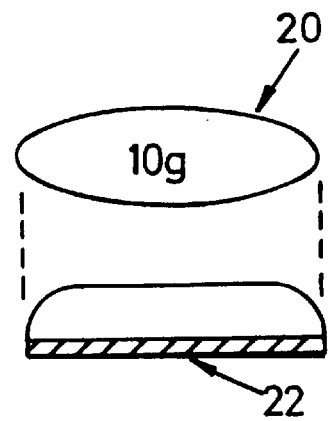
Figure 9:
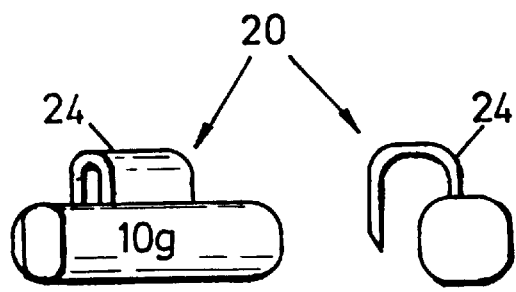
FIG. 9 is a perspective view and a sectional view showing another conventional weight piece.

FIGS. 4 to 6 show embodiments of the method to adhere a weight piece 10A to a tire wheel 15, wherein the weight piece 10A is prepared to be of desired length (weight) from the weight tape 10 according to this invention by cutting with a cutting tool such as scissors.

FIG. 4 shows an embodiment to attach the weight piece 10A on an inner surface of a rim 17 at an outside portion of the wheel 15 when viewed from a vehicle on which the tire wheel is mounted. The tape can be orderly adhered on the inner surface of the rim 17 in the circumferential direction of the wheel 15 in an orderly manner.

FIG. 5 shows an embodiment to attach the weight piece 10A on an inner surface of a rim 17 at an inside portion of the wheel 15 when viewed from the vehicle, wherein there is a step in the axial direction. However, the weight tape 10A can be adhered along the shape of the step in an orderly manner.

FIG. 6 shows an embodiment wherein a disc 16 of the wheel 15 comprises spokes 16A and the weight piece 10A needs to be attached to a position including the spoke 16A. In this case, a weight tape 10 having relatively wide width L is prepared. The tape 10 is cut into a temporary weight piece having longer length than that of the desired weight and a portion which contacts the spoke 16A is cut and removed from this temporary weight piece. After adjusting the weight, the excessive weight is removed from the longer segment of this temporary tape, and as a result a weight piece 10A to be adhered is prepared. Thus, even when the position to be modified has a complicated shape, the weight tape can be precisely adhered in such a manner.

In FIGS. 4 to 6, the drawing of a tire is omitted. However, a position where the unbalance should be modified, that is the position where the weight piece 10A is adhered on the wheel 15, and a weight that should be modified, that is the weight (length) of the weight piece 10A, are determined by setting a tire wheel, which is a combination of the tire and the wheel, on a balancer machine.

The weight tape 10 for modifying unbalance of the tire wheel according to this invention can be cut into a weight piece for modification having a desired weight by using the basic scale and the subsidiary scale. It is possible to easily modify unbalance within a small difference of one gram or less. Further, since the tape can be flexibly adhered to a portion having a complicated shape, it is possible to exactly adhere the weight piece 10A to a designated position, whereby the accuracy of modifying unbalance is enhanced easily. Furthermore, by indicating the direction of adhesion, the weight piece can be adhered in a manner that the direction of the long edge of the weight piece corresponds to the circumferential direction of the wheel, whereby precise modification can be attained.

While the invention has been particularly shown and described with reference to certain preferred embodiments thereof, it will be understood by those skilled in the art that various changes and modifications may be made within the spirit and scope of the invention.

We claim:

1. A weight tape for modifying unbalance of a tire wheel, comprising; a tape-like base portion which has substantially uniform thickness and constant width, wherein a basic scale indicating a basic weight is marked up on said base portion, and a subsidiary scale is drawn in a space between said basic scale to equally divide the space.

2. The weight tape according to claim 1, wherein one or more numerals indicating the basic weight accompanies said basic scale.

3. The weight tape according to claim 2, wherein one or more letters indicating a unit of weight accompanies said one or more numerals.

4. The weight tape according to claim 1, further comprising an adhesive portion provided on one side of said base portion, and wherein an indication showing a direction of adhesion is drawn on said base portion.

5. The weight tape according to claim 1, wherein said base portion is made of lead.

6. The weight tape according to claim 1, further comprising a heat-resistant adhesive portion provided on said base portion.

7. The weight tape according to claim 6, further comprising a separable material attached on said adhesive portion.

8. The weight tape according to claim 7, wherein the weight tape is wound with said separable material between each winding.

9. The weight tape according to claim 1, wherein said weight tape is an oblong-shaped and having a certain length.

10. The weight tape according to claim 1, wherein the thickness of said base portion is in the range of 0.3 mm to 1.0 mm.

11. The weight tape according to claim 1, wherein the width of the tape is in the range of 10 mm to 40 mm.

12. The weight tape according to claim 1 wherein said subsidiary scale indicates a fraction of said basic weight.

13. The weight tape according to claim 1 further comprising an arrow to indicate a direction of adhesion, said arrow positioned near said subsidiary scale.

14. The weight tape according to claim 1 further comprising an arrow to indicate a direction of adhesion, said arrow positioned near said basic scale.

* * * * *